(12) United States Patent
Osaki et al.

(10) Patent No.: US 9,280,370 B2
(45) Date of Patent: Mar. 8, 2016

(54) SYSTEM STRUCTURE MANAGEMENT DEVICE, SYSTEM STRUCTURE MANAGEMENT METHOD, AND PROGRAM

(75) Inventors: Takao Osaki, Tokyo (JP); Naotake Fujita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 234 days.

(21) Appl. No.: 13/635,601

(22) PCT Filed: Feb. 21, 2011

(86) PCT No.: PCT/JP2011/000951
§ 371 (c)(1),
(2), (4) Date: Sep. 17, 2012

(87) PCT Pub. No.: WO2011/114623
PCT Pub. Date: Sep. 22, 2011

(65) Prior Publication Data
US 2013/0019087 A1 Jan. 17, 2013

(30) Foreign Application Priority Data
Mar. 18, 2010 (JP) ................................. 2010-061813

(51) Int. Cl.
*G06F 9/455* (2006.01)
*G06F 9/50* (2006.01)

(52) U.S. Cl.
CPC .......... *G06F 9/45533* (2013.01); *G06F 9/5077* (2013.01)

(58) Field of Classification Search
None
See application file for complete search history.

(56) References Cited

U.S. PATENT DOCUMENTS 8,117,387 B2  2/2012  Matsuki et al.
8,516,191 B2  8/2013  Matsuki et al.
(Continued)

FOREIGN PATENT DOCUMENTS

CN  101582915 A  11/2009
JP  2005-234705 A  9/2005
(Continued)

OTHER PUBLICATIONS

Communication dated Sep. 19, 2014 from the State Intellectual Property Office of the P.R. of China, in counterpart application No. 201180014570.0.

*Primary Examiner* — Dong Kim
(74) *Attorney, Agent, or Firm* — Sughrue Mion, PLLC

(57) ABSTRACT

Physical configuration information stored in the physical configuration storage unit (110) indicates physical configuration elements of an information processing system and a connection relationship between the physical configuration elements. Virtual configuration information stored in a virtual configuration storage unit (120) indicates virtual configuration elements of a virtual system and a connection relationship between the virtual configuration elements. Here, the virtual system is a system that is functionally equivalent to the information processing system to be managed. Process configuration information stored in a process configuration storage unit (130) indicates process configuration elements of a process performed in the information processing system and a connection relationship between the process configuration elements. First correspondence information stored in a correspondence information storage unit (150) indicates a correspondence relationship between the physical configuration elements and the virtual configuration elements, and the second correspondence information indicates a correspondence relationship between the process configuration elements and the virtual configuration elements.

11 Claims, 9 Drawing Sheets

(56) References Cited

U.S. PATENT DOCUMENTS

| | | |
|---|---|---|
| 2001/0042118 A1* | 11/2001 | Miyake et al. ............... 709/223 |
| 2005/0198248 A1 | 9/2005 | Morimoto et al. |
| 2008/0313584 A1 | 12/2008 | Otsuka |
| 2009/0031222 A1* | 1/2009 | Nakamura et al. ............ 715/735 |
| 2011/0004914 A1* | 1/2011 | Ennis et al. ...................... 726/1 |

FOREIGN PATENT DOCUMENTS

| | | |
|---|---|---|
| JP | 2008-250808 A | 10/2008 |
| JP | 2009-251672 A | 10/2009 |
| WO | 2007/108061 A1 | 9/2007 |

* cited by examiner

SYSTEM STRUCTURE MANAGEMENT DEVICE, SYSTEM STRUCTURE MANAGEMENT METHOD, AND PROGRAM

CROSS REFERENCE TO RELATED APPLICATIONS

This application is a National Stage of International Application No. PCT/JP2011/000951 filed on Feb. 21, 2011, which claims priority from Japanese Patent Application No. 2010-061813, filed on Mar. 18, 2010, the contents of all of which are incorporated herein by reference in their entirety.

TECHNICAL FIELD

The present invention relates to a system structure management device, a system structure management method, and a program, which can manage the structure of an information processing system.

BACKGROUND ART

In information processing systems, software running on hardware realizes desired functions. In designing the information processing system, it is important to manage which function is realized in which hardware. For example, by allocating each element of a process configuration to configurations of hardware that realizes elements of the process configuration, it is possible to manage which function is realized in which hardware.

Further, Patent Document 1 discloses creation of a system configuration diagram from input configuration information and creation of operation policy data and applying this operation policy to configuration information of the system.

RELATED DOCUMENT

Patent Document

[Patent Document 1] Japanese Unexamined Patent Application Publication No. 2009-251672

DISCLOSURE OF THE INVENTION

Recently, large-scale and complex information processing systems have been in development. Because of this, it is difficult to grasp the structure of the information processing systems only by simply allocating each element of a process configuration to configurations of hardware that realizes elements of the process configuration.

An object of the present invention is to provide a system structure management device, a system structure management method, and a program, which can easily grasp the structure of an information processing system.

The present invention provides a system structure management device that manages the structure of an information processing system includes: a physical configuration storage unit storing physical configuration information indicating physical configuration elements of the information processing system and a connection relationship between the physical configuration elements; a virtual configuration storage unit storing virtual configuration information indicating virtual configuration elements of a virtual system, which is a system that is different from the physical configuration and functionally equivalent to the physical system, and a connection relationship between the virtual configuration elements; a process configuration storage unit storing process configuration information indicating process configuration elements of a process performed in the information processing system and a connection relationship between the process configuration elements; and a correspondence information storage unit storing first correspondence information indicating a correspondence relationship between the physical configuration elements and the virtual configuration elements and second correspondence information indicating a correspondence relationship between the process configuration elements and the virtual configuration elements.

The present invention provides a system structure management method that manages the structure of an information processing system includes: causing a computer to store physical configuration information indicating physical configuration elements of the information processing system and a connection relationship between the physical configuration elements; causing the computer to store virtual configuration information indicating virtual configuration elements of a virtual system, which is a system that is different from the physical configuration and functionally equivalent to the physical system, and a connection relationship between the virtual configuration elements; causing the computer to store process configuration information indicating process configuration elements of a process performed in the information processing system and a connection relationship between the process configuration elements; and causing the computer to store first correspondence information indicating a correspondence relationship between the physical configuration elements and the virtual configuration elements and second correspondence information indicating a correspondence relationship between the process configuration elements and the virtual configuration elements.

The present invention provides a program that causes a computer to function as a system structure management device that manages the structure of an information processing system, the program causing the computer to fulfill the functions of: storing physical configuration information indicating physical configuration elements of the information processing system and a connection relationship between the physical configuration elements; storing virtual configuration information indicating virtual configuration elements of a virtual system, which is a system that is different from the physical configuration and functionally equivalent to the physical system, and a connection relationship between the virtual configuration elements; storing process configuration information indicating process configuration elements of a process performed in the information processing system and a connection relationship between the process configuration elements; and storing first correspondence information indicating a correspondence relationship between the physical configuration elements and the virtual configuration elements and second correspondence information indicating a correspondence relationship between the process configuration elements and the virtual configuration elements.

According to the present invention, it is possible to easily grasp the structure of the information processing system.

BRIEF DESCRIPTION OF THE DRAWINGS

The above and other objects, features and advantages of the invention will be more apparent from the following detailed description taken in conjunction with the accompanying drawings, in which.

DESCRIPTION OF EMBODIMENTS

Figure 1:
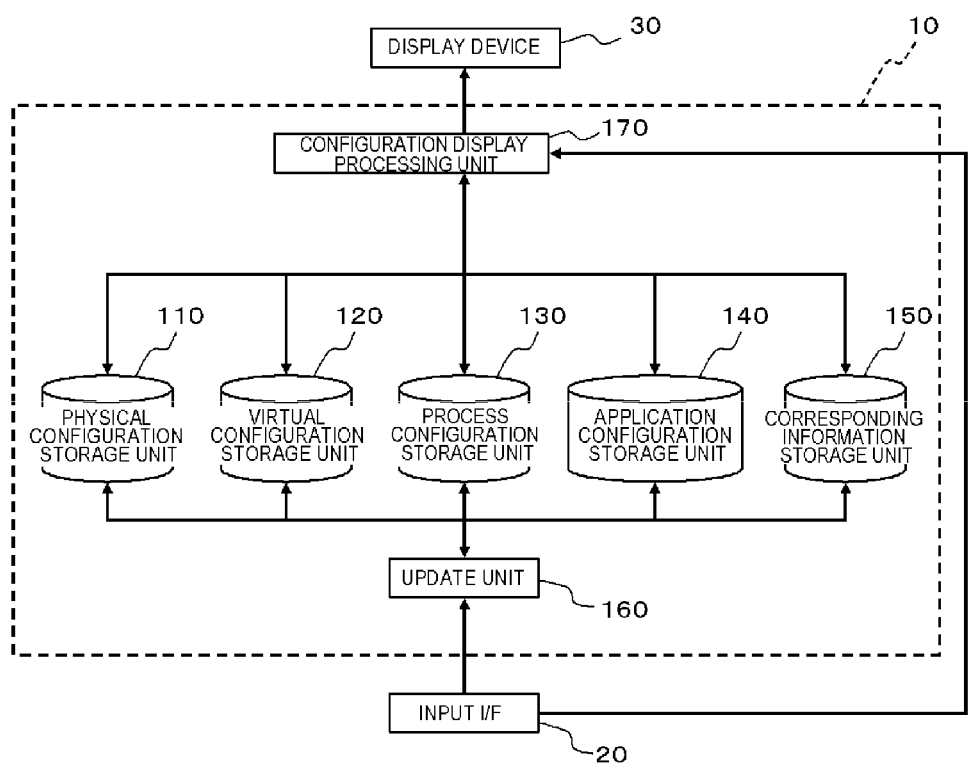
FIG. 1 is a block diagram illustrating the configuration of a system structure management device according to an embodiment.

Hereinafter, exemplary embodiments of the invention will be described with reference to the accompanying drawings. In all drawings, the same reference numerals are given to the same configuration elements, and the detailed description thereof will not be repeated.

FIG. 1 is a block diagram illustrating the configuration of a system structure management device 10 according to an embodiment. The system structure management device 10 is a device that manages the structure of an information processing system, and includes a physical configuration storage unit 110, a virtual configuration storage unit 120, a process configuration storage unit 130, and a correspondence information storage unit 150. The physical configuration storage unit 110 stores physical configuration information. The physical configuration information indicates physical configuration elements of the information processing system and a connection relationship between the physical configuration elements. The virtual configuration storage unit 120 stores virtual configuration information. The virtual configuration information indicates virtual configuration elements of a virtual system and a connection relationship between the virtual configuration elements. The virtual system is a system that is different from the physical configuration of the information processing system to be managed and functionally equivalent to the information processing system. The virtual configuration elements are virtual hardware. The virtual configuration elements and the connection relationship between the virtual configuration elements may be optionally determined, for example, by a designer of the information processing system. The process configuration storage unit 130 stores process configuration information. The process configuration information indicates process configuration elements of a process performed in the information processing system and a connection relationship between the process configuration elements. The process configuration information, for example, is information that is classified into a so-called process layer, and is a functional configuration at an Operating System (OS) level. The correspondence information storage unit 150 stores first correspondence information and second correspondence information. The first correspondence information indicates a correspondence relationship between the physical configuration elements and the virtual configuration elements, and the second correspondence information indicates a correspondence relationship between the process configuration elements and the virtual configuration elements.

In this embodiment, the system structure management device 10 further includes an application configuration storage unit 140, an update unit 160, and a configuration display processing unit 170.

The application configuration storage unit 140 stores application configuration information. The application configuration information indicates the functional configuration of the information processing system at a business application level, and is located on a layer next above the process layer.

Based on information input from a user through an input InterFace (I/F) 20, the update unit 160 stores various kinds of above mentioned information in the physical configuration storage unit 110, the virtual configuration storage unit 120, a process configuration storage unit 130, an application configuration storage unit 140, and the correspondence information storage unit 150 or updates their information law.

The configuration display processing unit 170 serves as first and second process configuration display units, first to third virtual configuration display units, a physical configuration display unit, and the physical failure information acquisition unit in the present invention.

Specifically, the configuration display processing unit 170 displays the process configuration elements on the display device 30 based on the process configuration information so that at least one of the process configuration elements can be selected. If the first process configuration element is selected on the display device 30, the configuration display processing unit 170 displays a virtual configuration element that corresponds to the first process configuration element on the display device 30 based on the second correspondence information and the virtual configuration information.

Further, the configuration display processing unit 170 displays the virtual configuration elements on the display device 30 based on the virtual configuration information so that at least one of the virtual configuration elements can be selected. If the first virtual configuration element is selected on the display device 30, the configuration display processing unit 170 displays a physical configuration element that corresponds to the first virtual configuration element on the display device 30 based on the second correspondence information and the virtual configuration information.

Further, the configuration display processing unit 170 acquires information that specifies a physical configuration element in which failure has occurred through the input I/F 20. Then, the configuration display processing unit 170 displays the virtual configuration element that corresponds to the physical configuration element specified by the information on the display device 30 based on the virtual configuration information and the second correspondence information so that the virtual configuration element can be discriminated on the display device 30.

Further, the configuration display processing unit 170 acquires information that specifies a virtual configuration element in which failure has occurred through the input I/F 20. Then, the configuration display processing unit 170 displays the process configuration element that corresponds to the virtual configuration element specified by the information on the display device 30 based on the process configuration information and the first correspondence information so that the process configuration element can be discriminated on the display device 30.

Note that the respective configuration elements of the system structure management device 10 shown in FIG. 1 show the blocks of functional units rather than the configuration of hardware units. The respective configuration elements of the system structure management device 10 are realized with any combination of hardware and software: a CPU of any computer; a memory; a program loaded in the memory that realizes the configuration elements in the drawing; a storage unit such as a hard disk for storing the program; and interfaces for connection to a network.

Figure 2:
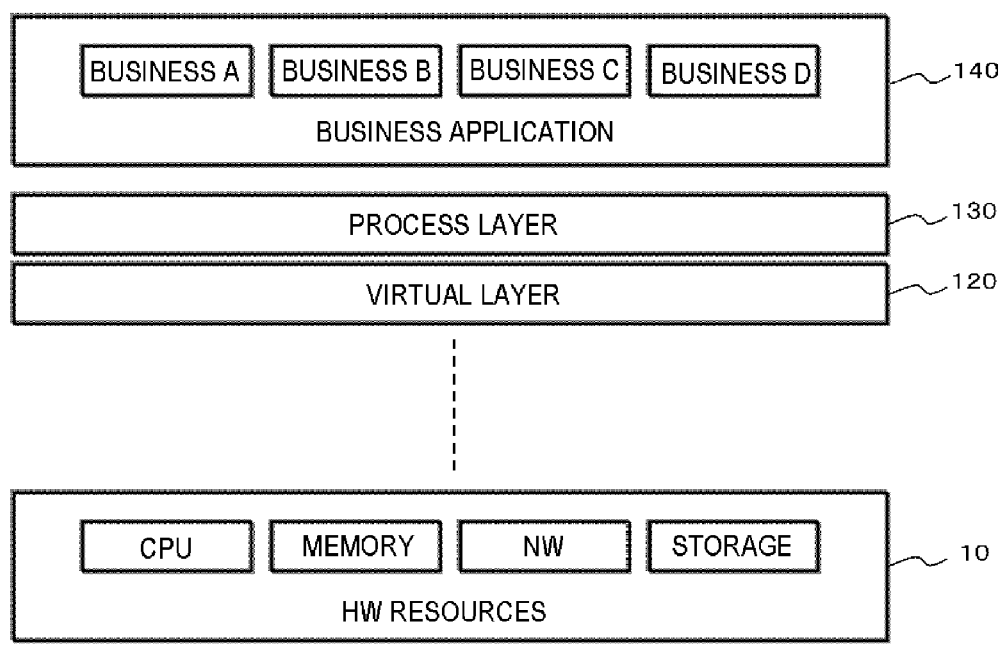
FIG. 2 is a diagram schematically illustrating how the system structure management device manages the configuration of an information processing system.

FIG. 2 is a diagram schematically illustrating how the system structure management device 10 manages the configuration of the information processing system. The system structure management device 10 stores the configuration of the information processing system in a physical layer composed of physical configuration information and virtual configuration information and a process layer composed of process configuration information and application configuration information. Specifically, the system structure management device 10 stores the configuration of the information processing system in each of the physical layer (physical configuration information), the virtual layer (virtual configuration information), the process layer (process configuration information), and the business application layer (application configuration information) from the bottom.

Among them, the configurations that can be visually confirmed from an outside may be the detailed configuration of hardware resources indicated by the physical configuration information in the physical configuration storage unit 110, and the detailed configuration of business application indicated by the application configuration information in the application configuration storage unit 140. However, it is not immediately recognized how the detailed configuration of the business application and the detailed configuration of the hardware resources are linked to each other. This problem is similar even in the case where the process layer is interposed between the detailed configuration of the hardware resources and the detailed configuration of the business application.

By contrast, in this embodiment, at least one virtual layer, that is, virtual configuration information, is placed between the detailed configuration of the hardware resources and the process layer. The virtual layer may be composed of multiple layers. The configuration of the virtual system indicated by the virtual configuration information may be optionally determined by a designer of the information processing system. Accordingly, it is possible to make it easy for third parties to easily grasp the structure of the information processing system if the designer of the information processing system properly determines the configuration of the virtual system. This will now be described in detail using FIGS. 3 to 6.

Figure 3:
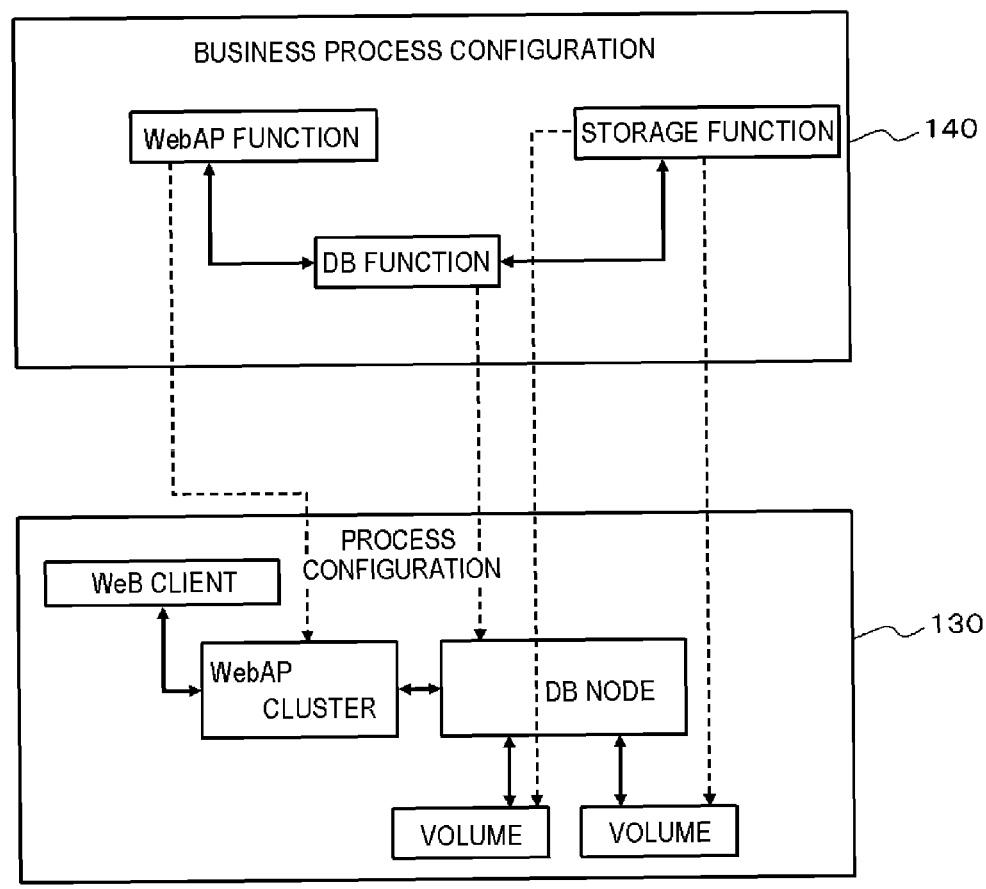
FIG. 3 is a diagram schematically illustrating application configuration information, process configuration information, and third correspondence information connecting the application configuration information and the process configuration information.

FIG. 3 is a diagram schematically illustrating the application configuration information stored in the application configuration storage unit 140, the process configuration information stored in the process configuration storage unit 130, and the third correspondence information connecting the application configuration information and the process configuration information. In FIG. 3, the third correspondence information is indicated by dotted arrows.

In the configurations shown in the drawing, the business process configuration, that is, the configuration of an application, is divided into a Web Application (WebAP) function, a Database (DB) function, and a storage function. Further, the process configuration is divided into a Web client, a WebAP cluster, a DB node, and at least one volume. In the process configuration, the WebAP cluster corresponds to the WebAP function of the business process, the DB node corresponds to the DB function of the business process, and the volumes corresponds to the storage function of the business process.

Figure 4:
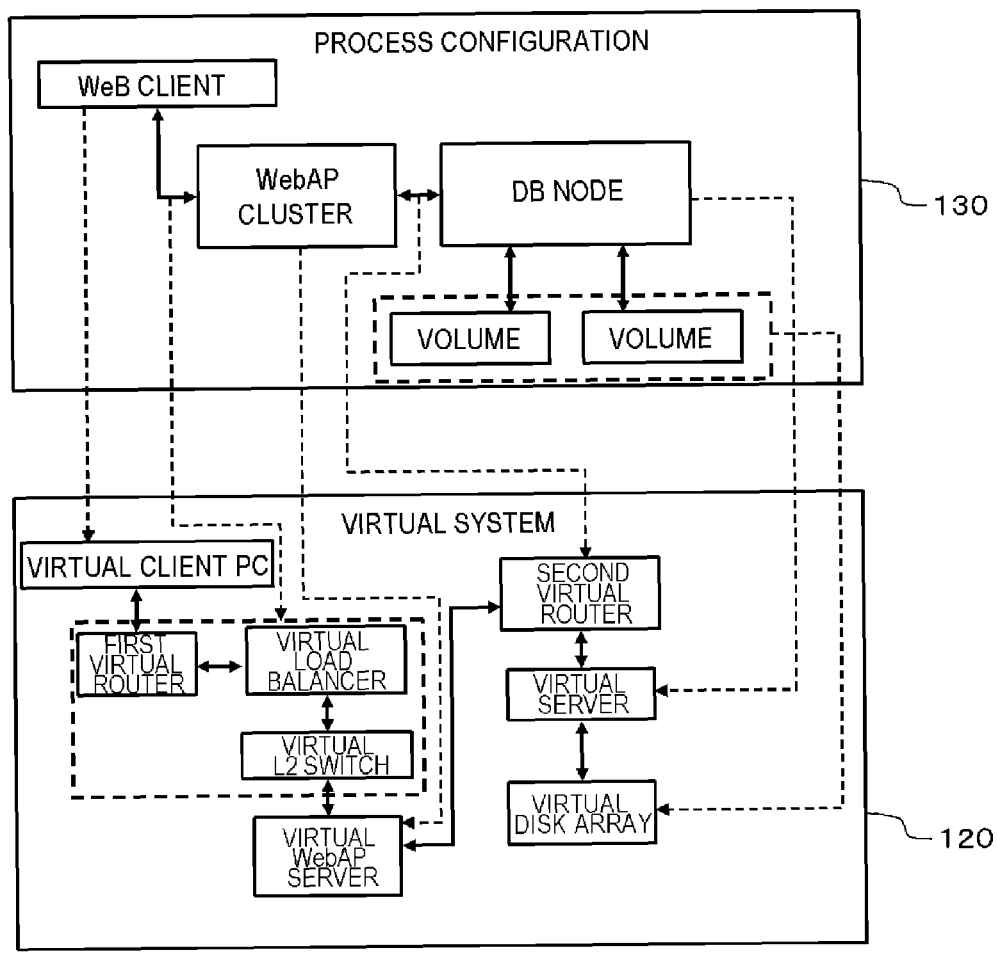
FIG. 4 is a diagram schematically illustrating process configuration information, virtual configuration information, and second correspondence information connecting the process configuration information and the virtual configuration information.

FIG. 4 is a diagram schematically illustrating the process configuration information stored in the process configuration storage unit 130, the virtual configuration information stored in the virtual configuration storage unit 120, and the second correspondence information connecting the process configuration information and the virtual configuration information. In FIG. 4, the second correspondence information is indicated by dotted arrows.

In the configurations shown in the drawing, the configuration of a process indicated by the process configuration information, in the same manner as in FIG. 3, is divided into a Web client, a WebAP cluster, a DB node, and at least one volume. Further, the virtual system configuration indicated by the virtual configuration information is composed of a virtual client PC, a first virtual router, a virtual load balancer, a virtual L2 switch, a virtual WebAP server, a second virtual router, a virtual server, and a virtual disk array.

In the virtual system, the virtual client PC corresponds to the Web client of the process configuration, the virtual WebAP server corresponds to the WebAP cluster of the process configuration, the virtual server corresponds to the DB node of the process configuration, and the virtual disk array corresponds to the volume of the process configuration. Further, the first virtual router, the virtual load balancer, and the virtual L2 switch correspond to the communication lines for connecting the Web client and the WebAP cluster in the process configuration, and the second virtual router corresponds to the communication lines for connecting the WebAP cluster and the DB node in the process configuration.

Figure 5:
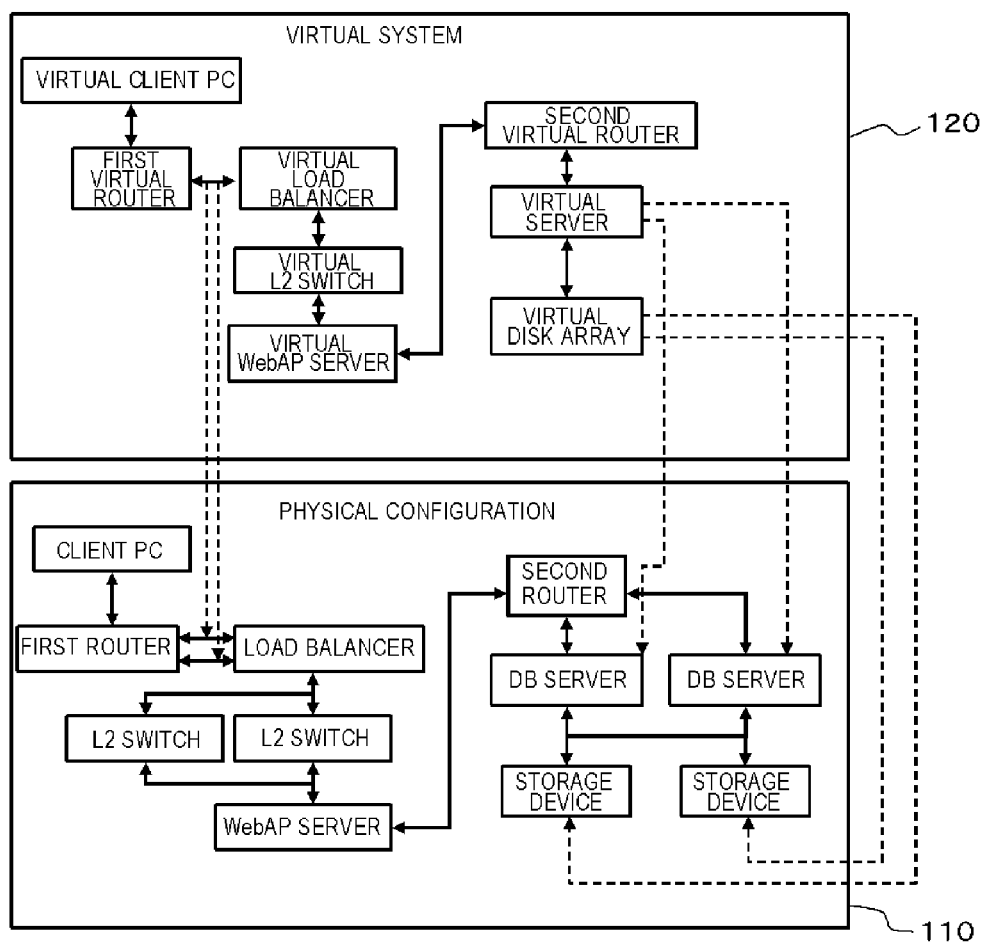
FIG. 5 is a diagram schematically illustrating virtual configuration information, physical configuration information, and first correspondence information connecting the virtual configuration information and the physical configuration information.

FIG. 5 is a diagram schematically illustrating the virtual configuration information stored in the virtual configuration storage unit 120, the physical configuration information stored in the physical configuration storage unit 110, and the first correspondence information connecting the virtual configuration information and the physical configuration information. In FIG. 5, the first correspondence information is indicated by dotted arrows.

In the configurations shown in the drawing, the configuration of a virtual system indicated by the virtual configuration information, in the same manner as in FIG. 4, is composed of a virtual client PC, a first virtual router, a virtual load balancer, a virtual L2 switch, a virtual WebAP server, a second virtual router, a virtual server, and a virtual disk array. Further, the physical configuration of the information processing system indicated by the physical configuration information is composed of a client PC, a first router, a load balancer, a plurality of L2 switches, a WebAP server, a second router, a plurality of DB servers, and a plurality of storage devices. Further, the first router and the load balancer are connected by a plurality of communication lines.

In comparing the virtual system and the physical configuration of the information processing system, a plurality of communication lines for connecting the first router and the load balancer are present in the physical configuration, whereas a single communication line is present in the virtual system. Further, a plurality of L2 switches is present in the physical configuration, whereas a single virtual L2 switch is present in the virtual system. Further, a plurality of DB servers is present in the physical configuration, whereas a single virtual server is present in the virtual system. Further, a plurality of storage devices is present in the physical configuration, whereas a single virtual disk array is present in the virtual system.

That is, in an example shown in FIG. 5, although the virtual system is substantially equivalent to the information processing system, it is simplified against the information processing system. Because of this, a third party except for the designer of the information processing system can easily recognize the structure of the information processing system through recognition of the system configuration of the virtual system. Accordingly, in the case of newly designing an information processing system that is similar to the information processing system of which the configuration is stored in the physical configuration storage unit 110, the third party can perform the system design with less effort by reference to the configuration of the virtual system.

Figure 6:
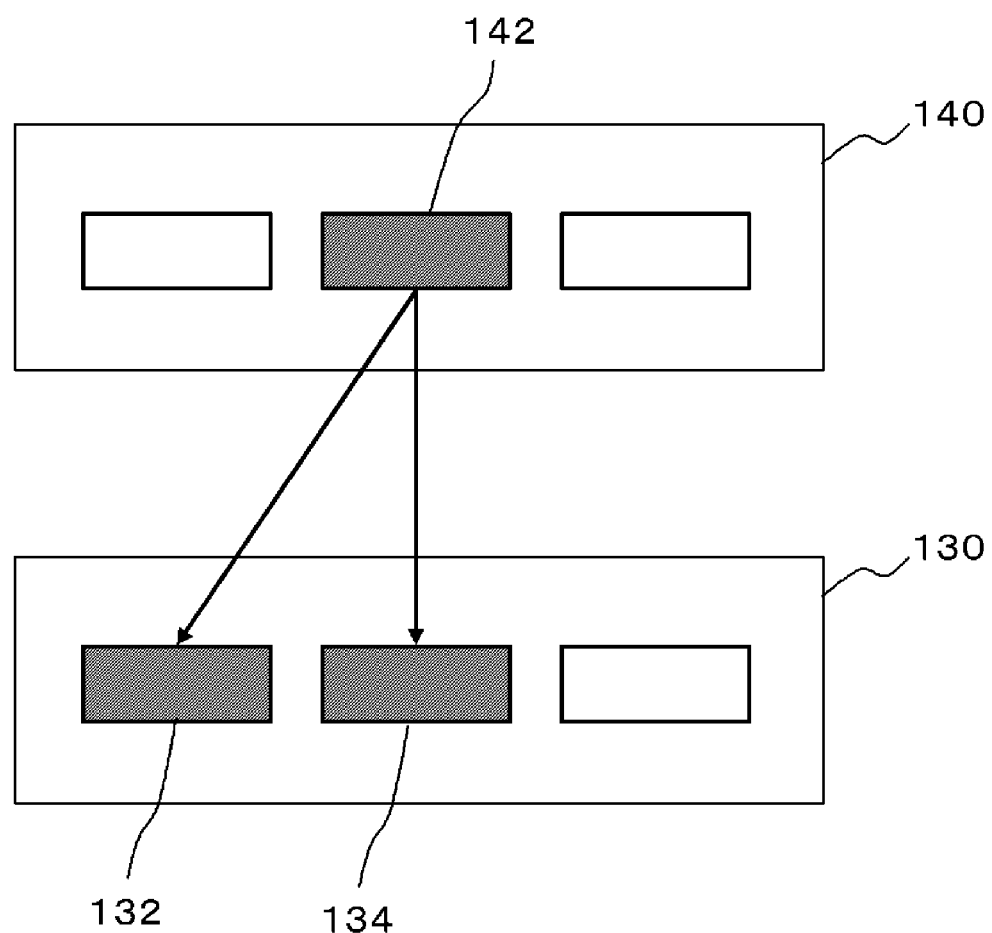
FIG. 6 is a diagram schematically illustrating a first process performed by a configuration display processing unit.
Figure 7:
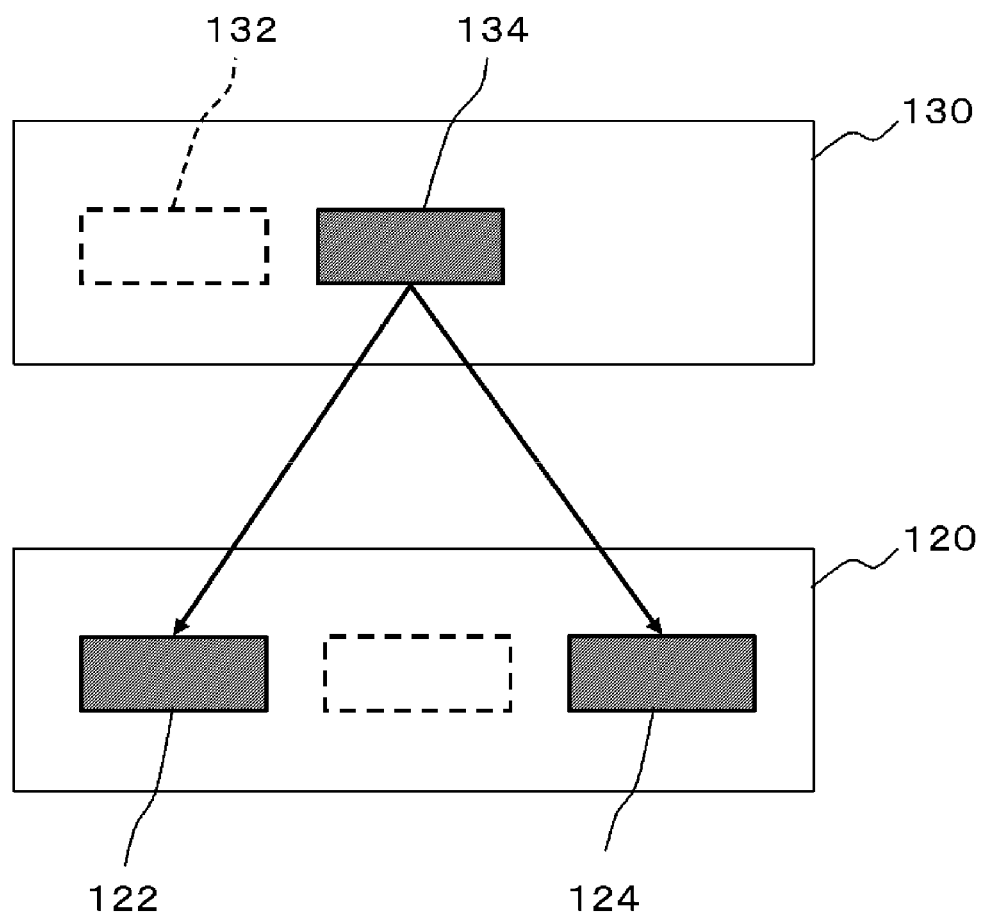
FIG. 7 is a diagram schematically illustrating a first process performed by a configuration display processing unit.
Figure 8:
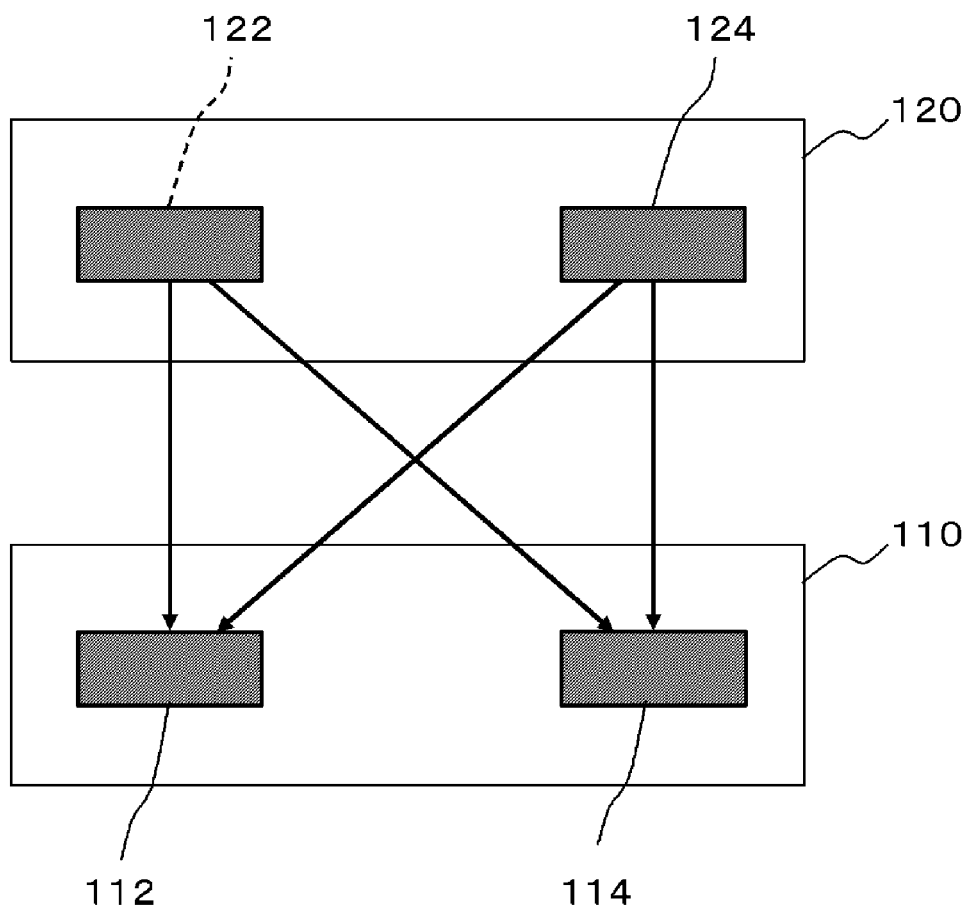
FIG. 8 is a diagram schematically illustrating a first process performed by a configuration display processing unit.

FIGS. 6 to 8 are diagrams schematically illustrating a first process that is performed by a configuration display processing unit 170. The process shown in the drawings is, for example, a process for searching for the physical configuration that causes a problem occurring in one configuration element of the business application.

First, as shown in FIG. 6, the configuration display processing unit 170 displays a plurality of configuration elements indicated by the application configuration information on the display device 30 (shown in FIG. 1) so that any of the configuration elements can be selected. Through this, a user of the system structure management device performs input to select the configuration element 142 in which a problem has occurred through an input I/F 20 (shown in FIG. 1). In this case, the configuration display processing unit 170 recognizes the process configuration elements 132 and 134 corresponding to the configuration element 142 using the third correspondence information and the process configuration information, and displays the recognized process configuration elements 132 and 134 on the display device 30 so that the process configuration elements 132 and 134 can be discriminated and selected from other process configuration elements. At this time, the configuration display processing unit 170 displays that the configuration element 142 corresponds to the process configuration elements 132 and 134, for example, using arrows, on the display device 30.

Thereafter, the user investigates the process configuration elements 132 and 134. Here, it is assumed that the process configuration element 134 has a problem.

Then, as shown in FIG. 7, the user of the system structure management device performs input to select the process configuration element 134 that has the problem from the process configuration elements 132 and 134 through the input I/F (shown in FIG. 1). Through this, the configuration display processing unit 170 recognizes the virtual configuration elements 122 and 124 corresponding to the process configuration element 134 using the second correspondence information and the virtual configuration information, and displays the recognized virtual configuration elements 122 and 124 on the display device 30 so that the virtual configuration elements 122 and 124 can be discriminated and selected from other virtual configuration elements. In an example shown in the drawing, the configuration display processing unit 170 displays only the virtual configuration elements 122 and 124 on the display device 30 so that the virtual configuration elements 122 and 124 can be selected. Further, the configuration display processing unit 170 displays that the process configuration element 134 corresponds to the virtual configuration elements 122 and 124, for example, using arrows, on the display device 30.

Then, the user of the system structure management device performs input to select the virtual configuration elements 122 and 124. Through this, the configuration display processing unit 170 recognizes the physical configuration elements 112 and 114 as the physical configuration elements corresponding to the virtual configuration element 122 using the first correspondence information and the physical configuration information, and also recognizes the physical configuration elements 112 and 114 as the physical configuration elements corresponding to the virtual configuration element 124 in the same manner. Then, the configuration display processing unit 170 displays the physical configuration elements 112 and 114 on the display device 30 so that the physical configuration elements 112 and 114 can be discriminated from other physical configuration elements. In an example shown in the drawing, the configuration display processing unit 170 displays only the physical configuration elements 112 and 114 on the display device 30. Further, the configuration display processing unit 170 displays that the virtual configuration elements 122 and 124 correspond to the physical configuration elements 112 and 114, for example, using arrows, on the display device 30.

Accordingly, the user of the system structure management device 10 can recognize that the problem of the configuration element 142 in the application configuration is caused by at least one of the physical configuration elements 112 and 114 of the information processing system with less effort.

Figure 9:
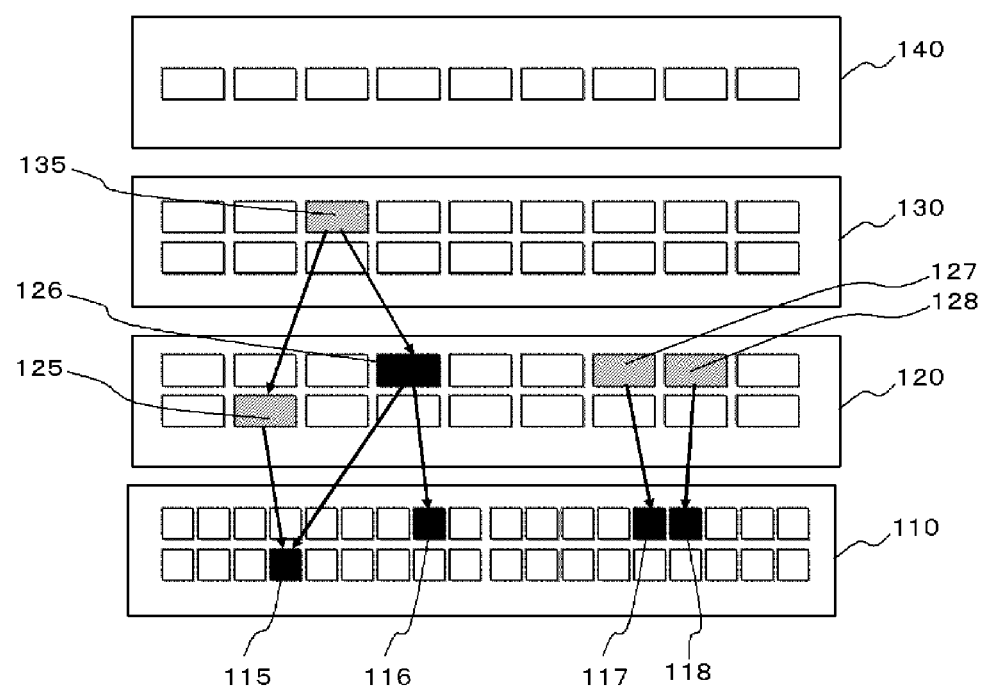
FIG. 9 is a diagram schematically illustrating a second process performed by a configuration display processing unit.

FIG. 9 is a diagram schematically illustrating the first process performed by the configuration display processing unit 170. As a precondition for the process shown in the drawing, the update unit 160 of the system structure management device 10 acquires information that indicates in which configuration element a problem has occurred in each of the physical layer, the virtual layer, the process layer, and the business application layer, through the input I/F 20. Further, the update unit 160 makes the information that indicates the problem occurrence correspond to configuration element discrimination information that discriminates the configuration elements in which the problem have occurred, and stores the information in the physical configuration storage unit 110, the virtual configuration storage unit 120, the process configuration storage unit 130, and the application configuration storage unit 140.

For example, if the information indicating that a problem has occurred in the physical configuration element is input to the input I/F 20, the configuration display processing unit 170 displays the respective configuration elements of the physical layer, the virtual layer, the process layer, and the business application layer in the form of a list. At this time, the configuration display processing unit 170 may display each of the configuration elements in which a problem has occurred in a manner that the corresponding configuration elements can be discriminated from other configuration elements. Here, the configuration display processing unit 170 may display the corresponding configuration elements differently in accordance with the size of the problem.

Then, the configuration display processing unit 170 displays the virtual configuration element that corresponds to the physical configuration element in which a problem has occurred on the display device 30 (shown in FIG. 1) so that the virtual configuration element can be discriminated from other configuration elements using the first correspondence information. Further, the configuration display processing unit 170 displays the process configuration element that corresponds to the virtual configuration element that has been displayed to be discriminated on the display device 30 so that the process configuration element can be discriminated from other process configuration elements using the second correspondence information.

In an example shown in the drawing, a problem has occurred in the physical configuration elements 115 to 118.

The physical configuration element 115 corresponds to the virtual configuration elements 125 and 126, and the physical configuration element 116 corresponds to the virtual configuration element 126. Further, the virtual configuration elements 125 and 126 correspond to the process configuration element 135. Because of this, the user of the system structure management device 10 can recognize that the problem that has occurred in the physical configuration elements 115 and 116 has affected the process.

On the other hand, the physical configuration element 117 corresponds to the virtual configuration element 127, and the physical configuration element 118 corresponds to the virtual configuration element 128. However, the virtual configuration elements 127 and 128 do not correspond to any process configuration element. Because of this, the user of the system structure management device 10 can recognize that the problems that have occurred in the physical configuration elements 117 and 118 have not affected a process.

As described above, the user of the system structure management device 10 can determine that the physical configuration elements 115 and 116 should be restored preferentially to the physical configuration elements 117 and 118. As described above, using the system structure management device 10, a user can easily grasp which problem should be preferentially solved when a plurality of problems occur in the information processing system.

As described above, although the embodiments of the invention have been described with reference to the drawings, they are exemplary, and diverse configurations may be adopted in addition to those as described above.

This application is based on Japanese Patent Application No. 2010-61813 filed on Mar. 18, 2010, the disclosure of which is incorporated herein by reference in its entirety.

The invention claimed is:

1. A system structure management device configured to manage the structure of an information processing system comprising:
a physical configuration storage unit configured to store physical configuration information indicating physical configuration elements of the information processing system and a connection relationship between the physical configuration elements;
a virtual configuration storage unit configured to store virtual configuration information indicating virtual configuration elements of a virtual system, which is a system that is different from the physical configuration and functionally equivalent to a physical system, and a connection relationship between the virtual configuration elements;
a process configuration storage unit configured to store process configuration information indicating process configuration elements of a process performed in the information processing system and a connection relationship between the process configuration elements;
a correspondence information storage unit configured to store first correspondence information indicating a correspondence relationship between the physical configuration elements and the virtual configuration elements and second correspondence information indicating a correspondence relationship between the process configuration elements and the virtual configuration elements;
an update unit which creates information indicating that a problem occurrence corresponds to configuration element discrimination information, the configuration element discrimination information indicating physical configuration elements, virtual configuration elements, or process configuration elements in which the problem has occurred, and stores the information in the physical configuration storage unit, the virtual configuration storage unit, and the process configuration storage unit; and
a configuration display processing unit configured to:
receive from a user a first input of selecting a process configuration element;
recognize the virtual configuration elements corresponding to the process configuration element selected with the first input using the virtual configuration information and the second correspondence information;
display the recognized virtual configuration elements in a selectable manner;
receive from a user a second input of selecting at least one of the displayed virtual configuration elements;
recognize the physical configuration elements corresponding to the virtual configuration elements selected with the second input using the physical configuration information and the first correspondence information; and
display the recognized physical configuration elements,
wherein the physical configuration storage unit, the virtual configuration storage unit, the process configuration storage unit, the correspondence information storage unit, the configuration display processing unit, and the update unit are implemented via a CPU.

2. The system structure management device according to claim 1,
wherein the information processing system comprises a router, a load balancer, and a plurality of communication lines connecting the router and the load balancer to each other, and
the virtual system comprises a virtual router that corresponds to the router, a virtual load balancer that corresponds to the load balancer, and one virtual communication line that corresponds to the plurality of communication lines.

3. The system structure management device according to claim 1,
wherein the information processing system comprises a plurality of switch devices arranged in parallel, and
the virtual system comprises one virtual switch device that corresponds to the plurality of switch devices.

4. The system structure management device according to claim 1,
wherein the information processing system comprises a plurality of servers, and
the virtual system comprises at least one virtual server that corresponds to the plurality of servers.

5. The system structure management device according to claim 1,
wherein the information processing system comprises a plurality of storage devices arranged in parallel, and
the virtual system comprises one storage device that corresponds to the plurality of storage devices.

6. The system structure management device according to claim 1, wherein the configuration display processing unit is further configured to:
receive from a user a third input of selecting a physical configuration element; and
display the virtual configuration elements corresponding to the physical configuration element selected with the third input using the physical configuration information, the virtual configuration information, and the first correspondence information.

7. The system structure management device according to claim 1, wherein the configuration display processing unit is further configured to:
- receive from a user a third input of selecting a virtual configuration element;
- display the physical configuration elements corresponding to the virtual configuration element selected with the third input using the virtual configuration information, the physical configuration information, and the first correspondence information.

8. The system structure management device according to claim 1, wherein the configuration display processing unit is further configured to:
- receive from a user a third input of selecting a physical configuration element;
- display the virtual configuration elements corresponding to the physical configuration element selected with the third input using the physical configuration information, the virtual configuration information, and the first correspondence information; and
- display the process configuration elements corresponding to the virtual configuration elements displayed by a virtual configuration element determination unit using the process configuration information, the virtual configuration information, and the second correspondence information.

9. The system structure management device according to claim 8, wherein the configuration display processing unit is further configured to:
- receive from a user a fourth input of selecting a virtual configuration element; and
- display the process configuration elements corresponding to the virtual configuration element selected with the fourth input using the virtual configuration information, the process configuration information, and the second correspondence information.

10. A system structure management method that manages the structure of an information processing system comprising:
- causing a computer to store physical configuration information indicating physical configuration elements of the information processing system and a connection relationship between the physical configuration elements;
- causing the computer to store virtual configuration information indicating virtual configuration elements of a virtual system, which is a system that is different from the physical configuration and is functionally equivalent to a physical system, and a connection relationship between the virtual configuration elements;
- causing the computer to store process configuration information indicating process configuration elements of a process performed in the information processing system and a connection relationship between the process configuration elements;
- causing the computer to store first correspondence information indicating a correspondence relationship between the physical configuration elements and the virtual configuration elements and second correspondence information indicating a correspondence relationship between the process configuration elements and the virtual configuration elements;
- causing the computer to receive from a user a first input of selecting a process configuration element;
- causing the computer to recognize the virtual configuration elements corresponding to the process configuration element selected with the first input using the virtual configuration information and the second correspondence information;
- causing the computer to display the recognized virtual configuration elements;
- causing the computer to receive from a user a second input of selecting at least one of the displayed virtual configuration elements;
- causing the computer to recognize the physical configuration elements corresponding to the virtual configuration elements selected with the second input using the physical configuration information and the first correspondence information;
- causing the computer to display the recognized physical configuration elements; and
- creating information indicating that a problem occurrence corresponds to configuration element discrimination information, the configuration element discrimination information indicating physical configuration elements, virtual configuration elements, or process configuration elements in which the problem has occurred, and storing the information in a physical configuration storage unit, a virtual configuration storage unit, and a process configuration storage unit;
- wherein the physical configuration storage unit, the virtual configuration storage unit, the process configuration storage unit are implemented via a CPU.

11. A non-transitory computer readable medium storing a program for causing a computer to function as a system structure management device that manages the structure of an information processing system, the program causing the computer to fulfill the functions of:
- storing physical configuration information indicating physical configuration elements of the information processing system and a connection relationship between the physical configuration elements;
- storing virtual configuration information indicating virtual configuration elements of a virtual system, which is a system that is different from the physical configuration and functionally equivalent to a physical system, and a connection relationship between the virtual configuration elements;
- storing process configuration information indicating process configuration elements of a process performed in the information processing system and a connection relationship between the process configuration elements;
- storing first correspondence information indicating a correspondence relationship between the physical configuration elements and the virtual configuration elements and second correspondence information indicating a correspondence relationship between the process configuration elements and the virtual configuration elements;
- receiving from a user a first input of selecting a the process configuration element;
- recognizing the virtual configuration elements corresponding to the process configuration element selected with the first input using the virtual configuration information and the second correspondence information;
- displaying the recognized virtual configuration elements;
- receiving from a user a second input of selecting at least one of the displayed virtual configuration elements;
- recognizing the physical configuration elements corresponding to the virtual configuration elements selected with the second input using the physical configuration information and the first correspondence information;

displaying the recognized physical configuration elements; and creating information indicating that a problem occurrence corresponds to configuration element discrimination information, the configuration element discrimination information indicating physical configuration elements, virtual configuration elements, or process configuration elements in which the problem has occurred, and storing the information in a physical configuration storage unit, a virtual configuration storage unit, and a process configuration storage unit;

wherein the physical configuration storage unit, the virtual configuration storage unit, the process configuration storage unit are implemented via a CPU.

* * * * *